United States Patent
Zerilli et al.

(10) Patent No.: US 7,471,089 B2
(45) Date of Patent: Dec. 30, 2008

(54) ELECTRODE ARRAY FOR MARINE ELECTRIC AND MAGNETIC FIELD MEASUREMENTS HAVING FIRST AND SECOND SETS OF ELECTRODES CONNECTED TO RESPECTIVE FIRST AND SECOND CABLES

(75) Inventors: Andrea Zerilli, Fiorenzuola D'Arda (IT); Ugo Conti, El Cerrito, CA (US); David Alumbaugh, Berkeley, CA (US)

(73) Assignee: Schlumberger Technology Corporation, Sugarland, TX (US)

( * ) Notice: Subject to any disclaimer, the term of this patent is extended or adjusted under 35 U.S.C. 154(b) by 290 days.

(21) Appl. No.: 11/379,917

(22) Filed: Apr. 24, 2006

(65) Prior Publication Data

US 2007/0247161 A1    Oct. 25, 2007

(51) Int. Cl.
*G01V 3/02*    (2006.01)
(52) U.S. Cl. ..................................... 324/365
(58) Field of Classification Search ......... 324/344–345, 324/347, 354–365; 702/11, 13, 14
See application file for complete search history.

(56) References Cited

U.S. PATENT DOCUMENTS

| 2,531,088 | A | * | 11/1950 | Thompson | 324/365 |
| 3,052,836 | A | * | 9/1962 | Postma | 324/365 |
| 4,298,840 | A | * | 11/1981 | Bischoff et al. | 324/365 |
| 4,617,518 | A |  | 10/1986 | Srnka |  |
| 4,633,182 | A |  | 12/1986 | Dzwinel |  |
| H1490 | H | * | 9/1995 | Thompson et al. | 367/15 |
| 5,770,945 | A |  | 6/1998 | Constable |  |
| 6,236,211 | B1 | * | 5/2001 | Wynn | 324/365 |

(Continued)

FOREIGN PATENT DOCUMENTS

JP    58037581 A    *    3/1983

(Continued)

OTHER PUBLICATIONS

Boerner, David E. et al., Orthogonality in CSAMT and MT Measurements, Geophysics, vol. 58, No. 7, Jul. 1993, pp. 924-934.

(Continued)

*Primary Examiner*—Jay M Patidar
(74) *Attorney, Agent, or Firm*—Dan C. Hu; Liangang (Mark) Ye; Jeffrey E. Griffin

(57) ABSTRACT

An electrode array for electric and magnetic measurements in a marine environment includes a first set of electrodes connected to a first cable, wherein the first set of electrodes and the first cable are configured to sink to a sea floor in the marine environment; a second set of electrodes connected to a second cable, wherein the second set of electrodes and the second cable are connected to the first cable and configured to float in the marine environment such that the second set of electrodes and the second cable maintain a distance from the sea floor when the first cable sits on the sea floor, and an instrument package connected to the first cable and the second cable, wherein the instrument package is configured to receive voltage signals measured by the first set of electrodes and the second set of electrodes.

20 Claims, 3 Drawing Sheets

U.S. PATENT DOCUMENTS 6,842,006 B2    1/2005    Conti et al.

FOREIGN PATENT DOCUMENTS

WO    WO0214906    2/2002

OTHER PUBLICATIONS

Chave, Alan D. et al., Controlled Electromagnetic Sources for Measuring Electrical Conductivity Beneath the Oceans, Journal of Geophysical Research, vol. 87, No. B7, pp. 5327-5338, Jul. 10, 1982.
Chave, Alan D. et al., Electrical Exploration Methods in Applied Geophysics vol. 2, Electrical Exploration Methods for the Seafloor, Chapter 12, 1991, pp. 931-966.
Constable, S. et al., Marine Controlled-Source Electromagnetic Sounding, Journal of Geophysical Research, vol. 101, No. B3, Mar. 10, 1996, pp. 5519-5530.
Constable, S. et al., Occam's Inversion: A Practical Algorithm for Generating Smooth Models from Electromagnetic Sounding Data, Geophysics, vol. 52, No. 3, Mar. 1987, pp. 289-300.
Edwards, R. Nigel, On the Resource Evaluation of Marine Gas Hydrate Deposits Using Sea-Floor Transient Electric Dipole-Dipole Methods, Geophysics vol. 62, No. 1, Jan.-Feb. 1997, pp. 63-74.
Edwards, R.N., Controlled Source Electromagnetic Mapping of the Crust, Encyclopedia of Solid Earth Geophysics, ed. James D. Van Nostrand Reinhold, New York, 1989, pp. 127-138.
Yuan, J. et al., Electromagnetic Assessment of Offshore Methane Hydrate Deposits on the Cascadia Margin, American Geophysical Union Fall Meeting, San Francisco, 1998, pp. 363-375.
Kearey, Philip, The Encyclopedia of the Solid Earth Sciences, Blackwell Scientific Publications, 1993, pp. 107, 141.
Evans, Rob L. et al., On the Electrical Nature of the Axial Melt Zone at 13 Degrees N on the East Pacific Rise, Journal of Geophysical Research, vol. 99, No. B1, Jan. 10, 1994, pp. 577-588.
Flosadottir, A. et al., Marine Controlled-Source Electromagnetic Sounding, Journal of Geophysical Research, vol. 101, No. B3, Mar. 10, 1996, pp. 5507-5517.
U.S. Dept. of Energy Office of Basic Energy Sciences, Division of Engineering and Geosciences, Two and Three-Dimensional Magnetotelluric Inversion, Technical Report: Dec. 1, 1991-May 31, 1994.
Grant, I.S. et al., Electromagnetism, Second Edition, John Wiley & Sons, 1990, pp. 1-5.
Kaufman, A. et al., Methods in Geochemistry and Geophysics, 16, pp. 284-313, Date N/A.
Kvenvolden, K. et al., A Primer on the Geological Occurrence of Gas Hydrate, Gas Hydrates: Relevance to World Margin Stability and Climate Change, Geological Society, London, Special Publications, 137, 9-30, Date not available.
MacGregor, L. et al., The RAMESSES Experiment—III. Controlled-Source Electromagnetic Sounding of the Reykjanes Ridge . . . , Geophys. J. Int. 1998, 135, pp. 773-789.
MacGregor, L. et al., Use of Marine Controlled Source Electromagnetic Sounding for Sub-Basalt Exploration, EAGE 61st Conference and Technical Exhibition, Helsinki, Finland, Jun. 7-11, 1999.
Nekut, A. et al., Petroleum Exploration Using Controlled-Source Electromagnetic Methods, Proceedings of the IEEE, vol. 77, No. 2, Feb. 1989.
Sinha, M. C. et al., Evidence for Accumulated Melt Beneath the Slow-Spreading Mid-Atlantic Ridge, Phil. Trans. R. Soc. Land. A, 355, 1997, pp. 233-253.
Sinha, Martin, Controlled Source EM Sounding: Survey Design Considerations for Hydrocarbon Applications, LITHOS Science Report, 1, 95-101, Apr. 1999.
Sinha, M. et al., An Active Source Electromagnetic Sounding System for Marine Use, Marine Geophysical Researches 1990, 12: 59-68.
Strack, K. et al., Integrating Long-Offset Transient Electromagnetic (LOTEM) with Seismics in an Exploration Environment, Geophysical Prospecting, 1996, 44, 997-1017.
Tseng, H. et al., A Borehole-to-Surface Electromagnetic Survey, Geophysics vol. 63, No. 5, pp. 1565-1572, Oct. 1995.
Das, Umesh C., Apparent Resistivity Curves in Controlled-Source Electromagnetic Sounding Directly Reflecting True Resistivities in a Layered Earth, Geophysics vol. 60, No. 1, Jan.-Feb. 1995, pp. 53-60.
Das, Umesh C., Frequency- and Time-Domain Electromagnetic Responses of Layered Earth-A Multiseparation, Multisystem Approach, Geophysics vol. 60, No. 1, Jan.-Feb. 1995, pp. 285-290.
Thompson, Arthur H. et al., U.S. Statutory Invention Registration H1490, Sep. 5, 1995.
Walker, Peter W. et al., Parametric Estimators for Current Excitation on a Thin Plate, Geophysics vol. 57, No. 6, Jun. 1992, pp. 766-773.
Ward, S.H. et al., Electromagnetic Theory for Geophysical Applications, in Investigations in Geophysics: Electromagnetic Methods in Applied Geophysics, ed. Nabighian, Society of Exploration Geophysicists, Oklahoma, 1988.
Yuan, J. et al., The Assessment of Marine Gas Hydrates through Electrical Remote Sounding: Hydrate without a BSR?, Geophysical Research Letters, vol. 27, Aug. 2000, pp. 2397-2400.
Yuan, Edwards et al., Electromagnetic Assessment of Offshore Methane Hydrate Deposits on the Cascadia Margin, MARELEC 1999.
Maurer, Hansruedi et al., Optimized Design of Geophysical Experiments, SEG Paper, Date not available.
Grant, I.S. et al., Electromagnetic Waves, Chapter 11, pp. 365-407, Date not available.

* cited by examiner

ELECTRODE ARRAY FOR MARINE ELECTRIC AND MAGNETIC FIELD MEASUREMENTS HAVING FIRST AND SECOND SETS OF ELECTRODES CONNECTED TO RESPECTIVE FIRST AND SECOND CABLES

BACKGROUND OF INVENTION

1. Field of the Invention

The invention relates generally to subsea exploration systems. More particularly, the invention relates to a marine electromagnetic measurement system and a method of using the same. More particularly still, the invention relates to a net-like array of electrodes to be deployed to a sea floor location wherein a portion of the electrodes rest on the sea floor and a portion of the electrodes are buoyant.

2. Background Art

Hydrocarbon exploration typically involves various prospecting methods, including various geophysical methods to detect the presence of hydrocarbons in the natural void space of the rock (measured as "porosity") or to map structural features in a formation of interest which are capable of trapping hydrocarbons.

To be mapped, the formation containing the hydrocarbons must possess a physical property contrast to which the geophysical method responds. For example, seismic methods involve emitting seismic waves into earth formations and receiving the reflected and/or diffracted seismic waves from the earth formations. Acoustic waves reflect off interfaces between different types of rocks with dissimilar seismic impedances. The velocities of the reflected or diffracted seismic waves depend on the densities of the rocks, which are in part due to the porosities and fluid contents of the rocks. However, the velocities of the reflected or diffracted seismic waves have very low sensitivity to the types of fluid (e.g., water or oil) in the pores, except for the presence of gas. Thus, seismic methods are useful in mapping the interfaces between different types of rocks. However, certain earth formations are not conductive to exploration through seismic methods. Salts, carbonates, and other particular formations may scatter seismic energy when it is propagated therethrough because of large velocity contrasts and inhomogeneities located within those formations.

In contrast, electrical conductivity (s), or its inverse, resistivity (?), is a physical property that can be measured with various electrical or electromagnetic (EM) methods. Such methods include, but are not limited to, direct current (DC) resistivity, induced polarization (IP) resistivity, magnetotelluric (MT) resistivity, and controlled source electromagnetic (CSEM) resistivity measurements. Regardless of the method employed, the measured resistivity of a formation depends strongly on the resistivity of the pore fluid and the porosity of the rock. Typical brine in sedimentary rock is highly conductive. The presence of brine in bulk rock renders the rock conductive. Hydrocarbons are, by comparison, electrically non-conductive. Consequently, the electrical conductivity of a rock is reduced when hydrocarbons are present. In general, different rocks in a given sedimentary section will have different porosities, so even in the absence of hydrocarbons, information about the sedimentary section can be determined. Thus, the combination of seismic and resistivity data is useful in assessing hydrocarbon content.

As mentioned above, one manner in which resistivity of a formation can be measured is through controlled source electromagnetic (CSEM) stimulation. As the name implies, a controlled transmitter stimulates a known current that is made to flow into the formations to be measured. Often, in CSEM systems, a circular loop of wire carrying a time-varying current is used as a controlled magnetic field source. This produces a time-varying magnetic field in the surroundings. The time-varying magnetic field in turn (according to Faraday's Law) produces a voltage which drives currents in the earth subsurface. Those currents produce voltages that are detected by electromagnetic receivers.

Typically, in marine CSEM applications, a high powered transmitter is towed by a surface ship and an array of receivers resting on the seafloor measures the voltages induced thereby. The induced CSEM voltage signals are detected by electrodes included in sensor packages or by a string of electrodes connected to a cable laid on the seafloor. Examples of receiver packages for detecting CSEM signals, for example, is disclosed in U.S. Pat. No. 5,770,945 issued to Constable and U.S. Pat. No. 6,842,006 issued to Conti, et al. Electrodes on a cable may be spaced a large distance apart to increase the sensitivity of electric field measurements. In addition, because the electrode array is constructed in a single cable, deployment is made simpler and require less capital investment.

While the prior art sensor packages and electrode cables for electromagnetic signal measurements in a marine environment are simple and cost effective, there is still a need for other sensor arrays that can provide more convenient measurements of various signals.

SUMMARY OF INVENTION

One aspect of the invention relates to electrode arrays for electric and magnetic measurements in a marine environment. An electrode array for electric and magnetic measurements in a marine environment in accordance with one embodiment of the invention includes a first set of electrodes connected to a first cable, wherein the first set of electrodes and the first cable are configured to sink to a sea floor in the marine environment; a second set of electrodes connected to a second cable, wherein the second set of electrodes and the second cable are connected to the first cable and configured to float in the marine environment such that the second set of electrodes and the second cable maintain a distance from the sea floor when the first cable sits on the sea floor; and an instrument package connected to the first cable and the second cable, wherein the instrument package is configured to receive voltage signals measured by the first set of electrodes and the second set of electrodes.

Another aspect of the invention relate to a method to measure electric and magnetic fields in a marine environment. A method in accordance with one embodiment of the invention includes deploying an array of electrodes to the sea floor, the array including a first set of electrodes lying on the sea floor and a second set of electrodes buoyant above the sea floor at a distance from the first set of electrodes; transmitting an electromagnetic energy into the marine environment; and measuring voltage signals using the array of electrodes.

Other aspects and advantages of the invention will be apparent from the following description and the appended claims.

DETAILED DESCRIPTION

Embodiments of the invention relate to an electromagnetic sensor array to be deployed in a marine environment. The sensor array preferably includes a plurality of voltage-sensing electrodes positioned in a net-like arrangement. An instrument package receives voltage values from each of the electrodes from which electric and magnetic fields can be calculated. Operators can analyze this electromagnetic data to determine the presence of hydrocarbons, or hydrocarbon-retaining formations beneath the sea floor.

Figure 1:
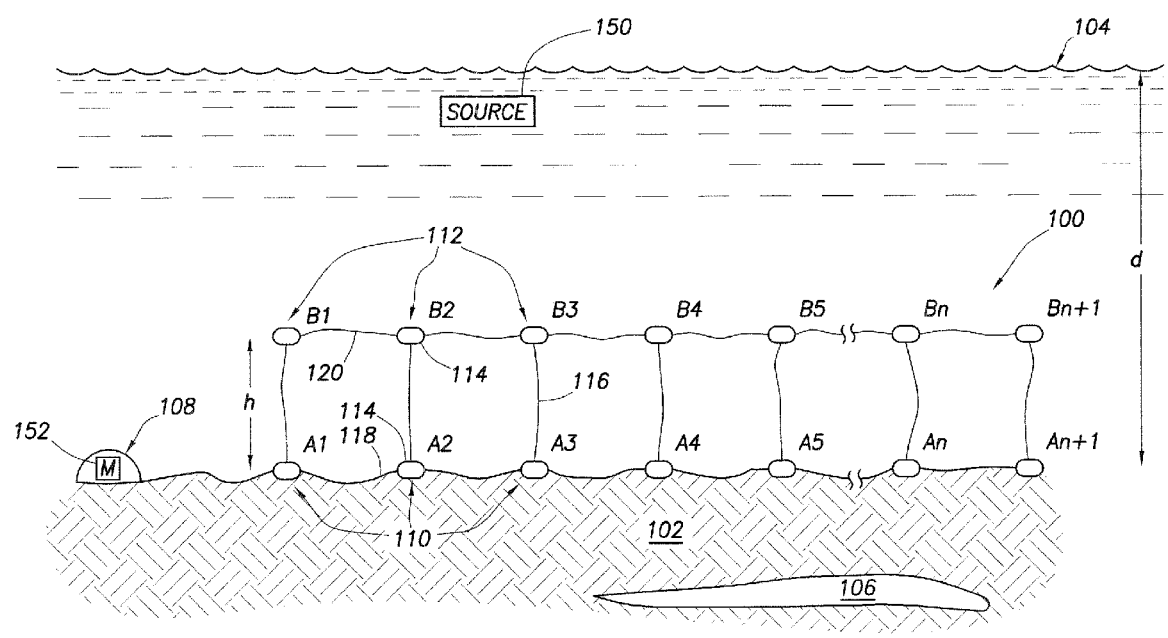
FIG. 1 is a profile-view drawing of an electromagnetic sensor array in accordance with an embodiment of the present invention.

Referring initially to FIG. 1, an electromagnetic sensing array 100 in accordance with an embodiment of the present invention is shown. Array 100 is shown deployed upon the sea floor 102 at a depth d below the waterline 104 and adjacent to a formation 106 to be investigated. Array 100 includes an instrument package 108 (which has a memory storage device 152), a first string of electrodes 110, and a second string of electrodes 112. First and second strings 110, 112 preferably include pluralities of sensor electrodes 114 that are configured in pairs to measure the voltage as a function of position in seawater.

First string of electrodes 110 includes a plurality of electrodes 114 (numbered $A_1$ through $A_{n+1}$) and is preferably configured to be negatively buoyant such that electrodes $A_1$ through $A_{n+1}$ rest upon sea floor 102 under their own weight. In contrast, second string 112 includes a plurality of electrodes 114 (numbered $B_1$ through $B_{n+1}$) that are positively buoyant such that electrodes $B_1$ through $B_{n+1}$ "float" above sea floor 102 at a predetermined height h. A plurality of vertical tension members 116 connect first string 110 to second string 112 such that predetermined height h for electrodes $B_1$ through $B_{n+1}$ is substantially maintained. While vertical tension members 116 are shown in FIG. 1 as connecting electrodes $B_1$ through $B_{n+1}$ of second string 112 directly to electrodes $A_1$ through $A_{n+1}$ of first string 110, it should be understood that other structural arrangements are possible. For example, vertical tension members 116 can be constructed either to connect electrodes $B_1$ through $B_{n+1}$ directly to sea floor 102 or to connect horizontal cables segments 118, 120 connecting electrodes $A_1$ through $A_{n+1}$ and $B_1$ through $B_{n+1}$, respectively, together. Furthermore, buoyancy of second string 112 of electrodes $B_1$ through $B_{n+1}$ is sufficient to place members 116 in tension, but not so great as to prevent first string 110 of electrodes $A_1$ through $A_{n+1}$ from properly lying on sea floor 102. Once positioned upon sea floor 102 over formation 106, array 100 resembles a vertical fishing net.

The deployment of array 100 can be through any number of methods but is preferably completed in a towing operation. In such an operation, array 100 is towed behind a surface vessel (not shown) to a desired location above formation 106. Once the array 100 is placed on the sea floor, an instrument package 108 is also placed on the sea floor for the measurements. The instrument package 108 may include a releasable anchor (not shown) for it to stay on sea floor 102. In addition, the instrument package 108 may include floatation and an acoustic release system that allows it to be easily retrieved by a surface vessel using acoustic signals. See, for example, U.S. Pat. No. 5,770,945 issued to Constable. The floatation and acoustic release system permit easy retrieval of the instrument package 108 by sending an acoustic signal commanding the release of instrument package 108 form the anchor (or weight) to allow the instrument package 108 to float to the surface for retrieval.

As an alternative method of deployment, instrument package 108 and the releasable anchor (if present) can be joined to array 100 and towed by the surface vessel. Once instrument package 108 is released by the towing vessel, it (along with the anchor) can guide the array 100 down until both the instrument package 108 and first string 110 (having electrodes $A_1$ through $A_{n+1}$) rest on sea floor 102 at a depth d below the water surface 104. If more precise control over array 100 is desired, a releasable guide wire (not shown) can extend from the towing vessel to the instrument package 108.

In operation, electrodes 114 of array 100 are able to relay information to instrument package 108, thus enabling the measurement of electric and magnetic fields at the sea floor 102. Each electrode 114 is configured to sense the voltage V of the sea water in which it is located. Voltages V for each electrode 114 may be measured relative to a single reference electrode (not shown) and are recorded in instrument package 108 as electrical potential values ($P_{A1}$, $P_{B1}$, etc.) relative to the single reference electrode.

Accordingly, the voltage difference between electrode $A_1$ and electrode $A_2$ in first string of electrodes 110 would be represented by $V_{A1A2} = P_{A1} - P_{A2}$. By normalizing the voltage difference with the dipole, or distance between the two electrodes, the horizontal electric field component ($E_{A1A2}$) in the region between electrode $A_1$ and $A_2$ can be calculated. Similarly, if the voltage difference between electrode $A_1$ of first string 110 and electrode $B_1$ of second string 112, represented by $V_{A1B1} = P_{A1} - P_{B1}$, is measured and distance-normalized (assuming the distance between electrodes $A_1$ and $B_1$ is known), the vertical electrical field component ($E_{A1B1}$) can be calculated. Furthermore, the horizontal electric field component between two electrodes of second string 112 (e.g., $E_{B1B2}$ for $B_1$ and $B_2$) can be calculated. Therefore, through the arrangement of electromagnetic array 100 shown in FIG. 1, electric field components in two horizontal planes and one vertical plane can be calculated. Using prior art sensor packages or sensor cable designs, electric field components can only be calculated in a single plane.

Furthermore, electromagnetic array 100 in accordance with an embodiment of the present invention allows for the calculation of magnetic fields in addition to the electric fields described above. The relationship between the electric and magnetic fields is defined by Faraday's Law:

$$\nabla \times E = -i\omega B, \tag{1}$$

where E represents the vector electric field, B the vector magnetic field, $\omega$ is the radial frequency at which the measurement is being made, and i is $\sqrt{(-1)}$. The $\nabla \times$ symbol represents the curl operator, which for the arrangement in FIG. 1 reduces to:

$$\frac{\partial E_z}{\partial x} - \frac{\partial E_x}{\partial z} = -i\omega B_y, \tag{Eq. 2}$$

where the x direction is parallel to the horizontal electrode strings, the z direction is positive downward, and the y direction is normal to the plane of the drawing in FIG. 1 (i.e., out of the page). The partial derivatives can be approximated, for example within the first segment of the electrode net, as:

$$\frac{\partial E_z}{\partial x} \approx \frac{E_{zA2B2} - E_{zA1B1}}{\Delta x} \text{ and } \frac{\partial E_x}{\partial z} \approx \frac{E_{xA1A2} - E_{xB1B2}}{\Delta z}, \quad \text{(Eq. 3)}$$

where $\Delta x$ and $\Delta z$ represent the distances between the corresponding electrodes.

Furthermore, from the discussion above, the horizontal and vertical electric field components are given as:

$$E_{xA1A2} = \frac{V_{A1A2}}{\Delta x}; \quad \text{(Eq. 4)}$$

$$E_{zA1B1} = \frac{V_{A1B1}}{\Delta z}, \text{ etc.}$$

Substituting these expressions into Equation (1) (i.e., Faraday's law) above yields the expression for the magnetic field in terms of the voltages and electrode separations:

$$B_{y12} \approx i \frac{V_{A2B2} - V_{A1B1} - V_{A1A2} + V_{B1B2}}{\omega \Delta x \Delta z}, \quad \text{(Eq. 5)}$$

where $B_{y12}$ is the magnetic field in the y direction measured by electrodes $A_1$, $A_2$, $B_1$, and $B_2$. It should be understood by one of ordinary skill in the art that various other magnetic fields can be calculated by selecting four (or more) different electrodes 114 to make the measurement. Furthermore, because the $\Delta x$ and $\Delta z$ values are in the denominator of the relation, it should be understood that at least two electrodes 114 from first string 110 and two electrodes from second string 112 should be used in the calculation. Otherwise, the calculation can fail for division by zero. Additionally, the distances between electrodes 114 in the x axis direction (i.e., lengths of cables segments 118, 120) and in the z axis direction (i.e., the length of vertical tension members, 116) can be varied to allow for a wide range of electric and magnetic field measurements. Furthermore, the frequency ω can be varied to change the measurement sensitivity.

An additional benefit of sensor array 100 over single-string electrode cables of the prior art is the use of measurements from second string 112 of array 100 to adjust values measured by first string 110. In certain situations, particularly those in which the EM measurements are made in shallow water, the interface from the sea water and air at surface 104 can degrade the sensitivity in measuring responses from reservoir 106. The air-water interface can affect the sensitivity and response of the electromagnetic system; particularly, when the water depth d is less than the distance between the sea floor 102 and the reservoir 106. With array 100, the upper string 112 of electrodes is more sensitive to the air-water interface than the lower string 110. Therefore, the measurements obtained by the upper electrodes can be used to differentiate and normalize the signals detected by the lower electrodes to minimize interference from the air-water interface.

Figure 2:
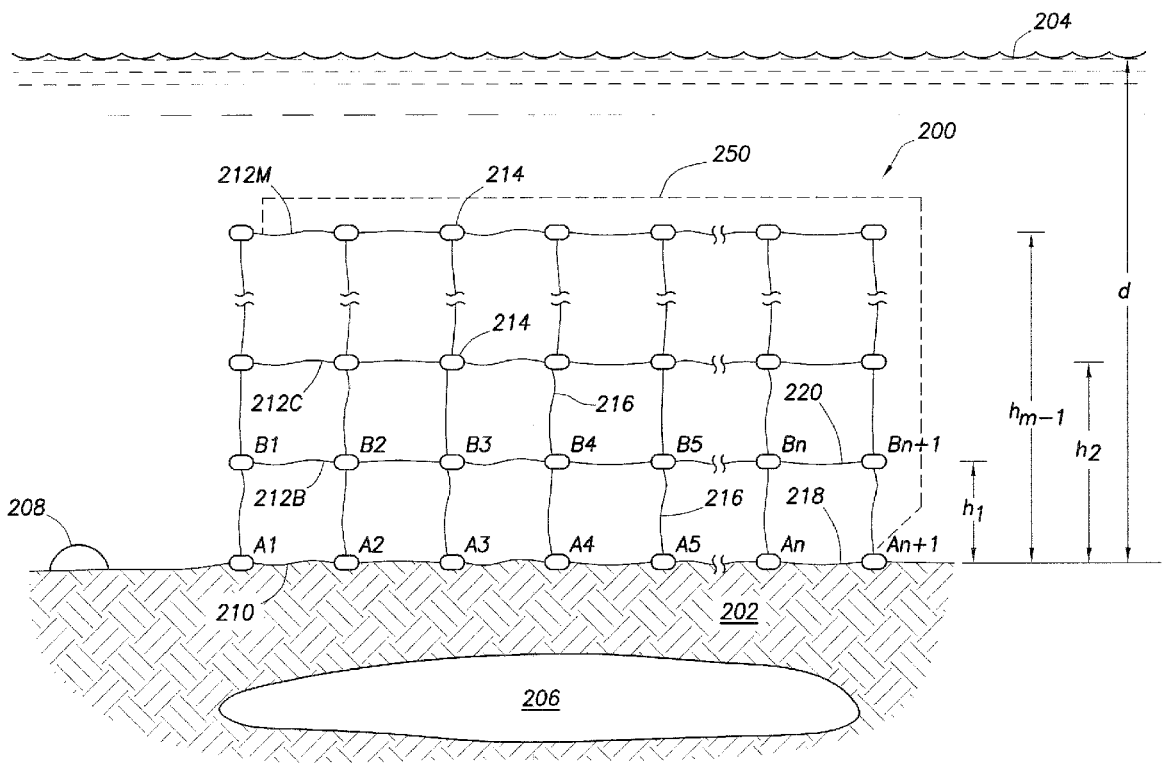
FIG. 2 is a profile-view drawing of an electromagnetic sensor array in accordance with an alternative embodiment of the present invention.

Referring now to FIG. 2, an alternative embodiment of a sensor array 200 in accordance with another embodiment of the present invention is shown. Sensor array 200 is similar in construction to sensor array 100 of FIG. 1, except that array 200 contains additional strings (e.g. 212C through 212M) above the second string 212B of electrodes 214. As with array 100 FIG 1, a instrument package 208 and a first string 210A of electrodes 214 are set on sea floor 202 at a depth d below water surface 204.

Electrodes 214 of FIG. 2 are labeled in two-dimensional array 200 extending form $A_1$ to $M_{n+1}$, where n+1 is an integer representing the index of the last electrodes 214 in the positive x-axis direction and M represents the last string of electrodes 214 in the negative z-axis direction. While array 200 is represented in FIG. 2 as a rectangular array having dimensions n+1 (number of electrodes in horizontal string) by m (number of horizontal strings), it should be understood that any variety of geometries and sizes for array 200 can be deployed without departing from the scope of the present invention.

Array 200 is constructed such that string 212B is a height $h_1$ above sea floor 202, string 212C is a height $h_2$ above sea floor 202, and string 212M is a height $h_{m-1}$ above sea floor 202. Vertical tension members 216 preferably connect strings 210A, 212B, 212C, ..., 212M together to maintain heights $h_1, h_2, \ldots, h_{m-1}$ in the array 200. As with array 100 of FIG. 1, horizontal cable segments 218, 220, etc. of cables 210A, 212B, 212C, ..., 212M connect adjacent electrodes 214 in the x-axis direction. Although the segment lengths of the cables and the vertical spacing between strings are shown to be roughly equal, the invention is not so limited and each of those lengths can vary one from the other.

Using array 200 of FIG. 2, a number of horizontal (x-y plane) electric field components and a number of electric and magnetic field components in the x-z plane (i.e., the plane of array 200) can be measured. Furthermore, array 200 can also be constructed as a three-dimensional array such that additional strings (represented in dashed profile 250 in FIG. 2) of electrodes 214 in the x-z plane, offset in the y-direction from array 200 are included as well. Using such a three-dimensional array, magnetic and electric field measurements in several additional planes can be made. Having additional planes of electromagnetic investigation can provide better assessments of the formation 206.

Figure 3:
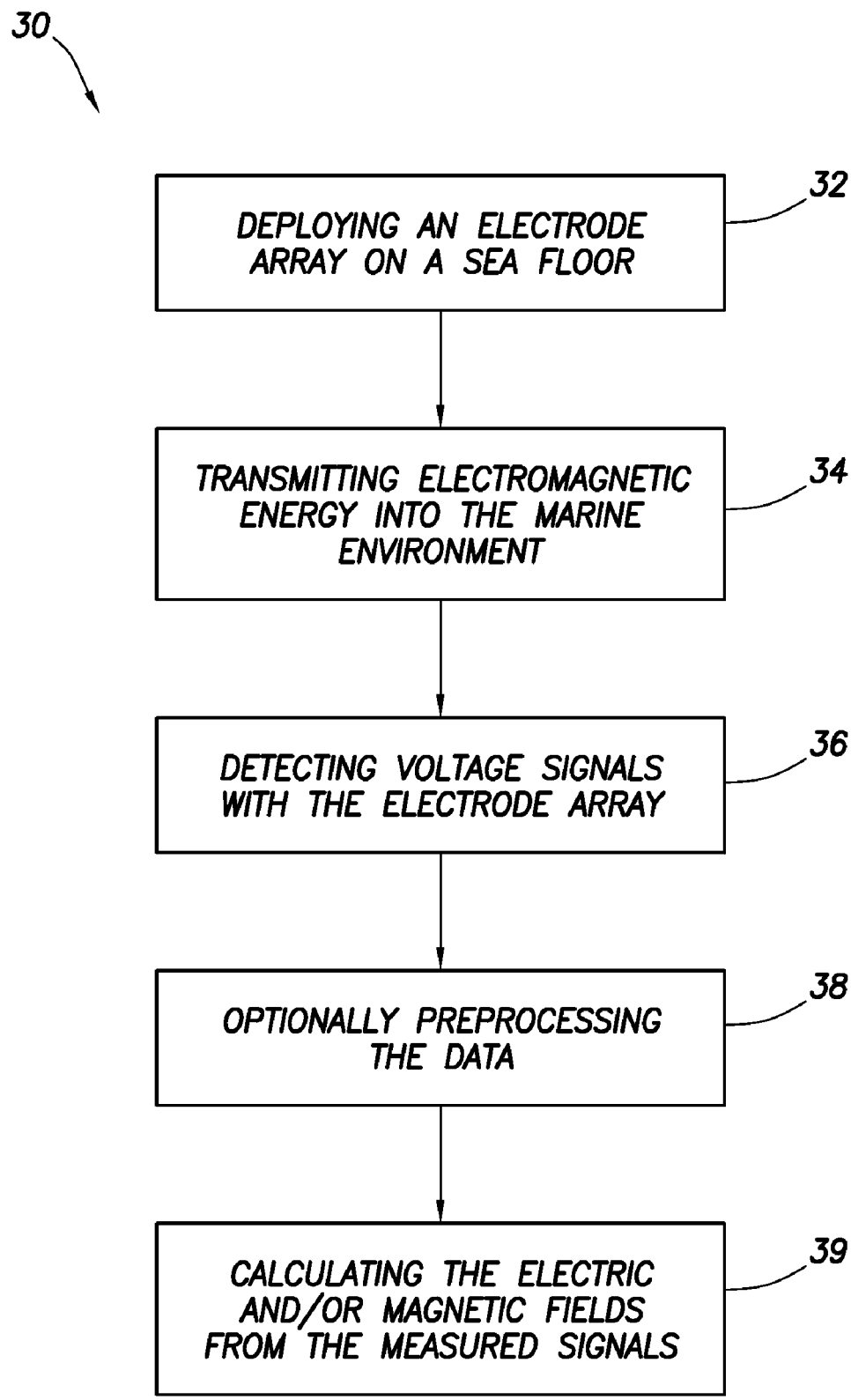
FIG. 3 shows a method for measuring electric and/or magnetic fields in a marine environment in accordance with one embodiment of the invention.

Some embodiments of the invention relate to measuring electric and magnetic fields in a marine environment using an electrode array described above. FIG. 3 shows a method in accordance with one embodiment of the invention. As shown in FIG. 3, a method 30 includes first deploying an electrode array on a sea floor (step 32). The electrode array may have any of the configuration described above. Electromagnetic energy, which may be from a controlled source 150 (FIG. 1) towed through the marine environment, is transmitted to the marine environment to induce current flow in the subsea formation (step 34). Signals returned to the electrodes are detected and recorded, for example using the instrument package described above or alternatively using a device in a vessel (step 36). The detected signals may be preprocessed, for example, to minimize or remove interference from the air-water interface as described above (step 38). The measured or preprocessed signals are then used to calculate the electric and/or magnetic fields (step 39).

While the invention has been described with respect to a limited number of embodiments, those skilled in the art, having benefit of this disclosure, will appreciate that other embodiments can be devised which do not depart from the scope of the invention is disclosed herein. Accordingly, the scope of the invention should be limited only by the attached claims.

What is claimed is:

1. An electrode array for electric and magnetic measurements in a marine environment, comprising:
    a first set of electrodes connected to a first cable, wherein the first set of electrodes is configured to sink to a sea floor in the marine environment; and
    a second set of electrodes connected to a second cable, wherein the second set of electrodes is configured to float in the marine environment a distance from the sea floor when the first set of electrodes rests on the sea floor, wherein the first cable and the second cable are connected by a plurality of tension members.

2. The electrode array of claim 1, further comprising an instrument package connected to at least one of the first and second cables, wherein the instrument package is configured to receive voltage signals measured by the first and second sets of electrodes.

3. The electrode array of claim 2, wherein the instrument package includes a floatation and release system.

4. An electrode array for electric and magnetic measurements in a marine environment, comprising:
   a first set of electrodes connected to a first cable, wherein the first set of electrodes is configured to sink to a sea floor in the marine environment; and
   a second set of electrodes connected to a second cable, wherein the second set of electrodes is configured to float in the marine environment a distance from the sea floor when the first set of electrodes rests on the sea floor,
   wherein the first set of electrodes and the second set of electrodes are connected by a plurality of tension members.

5. An electrode array for electric and magnetic measurements in a marine environment, comprising:
   a first set of electrodes connected to a first cable, wherein the first set of electrodes is configured to sink to a sea floor in the marine environment; and
   a second set of electrodes connected to a second cable, wherein at least one of the second set of electrodes and the second cable is connected to at least one of the first set of electrodes and the first cable and the second set of electrodes is configured to float in the marine environment a distance from the sea floor when the first set of electrodes rests on the sea floor; and
   one or more additional sets of electrodes connected to one or more additional cables, wherein each of the one or more additional sets of electrodes is configured to situate at a distance above a previous set of electrodes when deployed in the marine environment.

6. A method to determine electric and magnetic fields in a marine environment, comprising:
   deploying an array of electrodes to a sea floor, the array including a first structure having a first set of electrodes lying on the sea floor and a second structure having a second set of electrodes above the sea floor at a distance from the first set of electrodes;
   interconnecting the first and second structures using interconnecting members;
   transmitting electromagnetic energy into the marine environment; and
   measuring voltage signals using the array of electrodes.

7. The method of claim 6, wherein the array of electrode further comprising an instrument package in communication with each of the electrodes.

8. The method of claim 7, further comprising calculating, based on the measured voltage signals, one or more components of the electric and magnetic fields.

9. The method of claim 6, wherein the array of electrode further comprises one or more additional sets of electrodes disposed above a previous set of electrode for measuring additional voltage signals.

10. The method of claim 9, further comprising calculating, based on the measured voltage signals, one or more components of the electric and magnetic fields.

11. The method of claim 9, further comprising adjusting values measured by certain electrodes based on voltage signals measured by different electrodes.

12. The method of claim 6, wherein the first structure further includes a first cable connecting the first set of electrodes, and the second structure further includes a second cable connecting the second set of electrodes.

13. The method of claim 6, wherein interconnecting the first and second structures using the interconnecting members comprises interconnecting the first and second structures using tension members.

14. A method to determine electric and magnetic fields in a marine environment, comprising:
   deploying an array of electrodes to a sea floor, the array including a first set of electrodes lying on the sea floor and a second set of electrodes above the sea floor at a distance from the first set of electrodes;
   transmitting electromagnetic energy into the marine environment;
   measuring voltage signals using the array of electrodes; and
   correcting interference from an air-water interface based on differences between voltage signals measured by the first set of electrodes and voltage signals measured by the second set of electrodes.

15. A system to measure voltages at various locations in a marine environment, comprising:
   an electromagnetic energy source;
   an array of electromagnetic receivers arranged in a substantially vertical grid in the marine environment; and
   an instrumentation package in electrical communication with the receivers,
   wherein the array of receivers comprises a plurality of cables, with a first cable of the plurality of cables disposed on a sea floor, a second cable of the plurality of cables joined by a connecting member to the first cable and disposed a desired height substantially above the first cable, and each subsequent cable of the plurality of cables similarly joined to and disposed above the preceding cable.

16. The system of claim 15, wherein the electromagnetic source is towed through the marine environment.

17. The system of claim 15, wherein the instrumentation package has a memory storage device.

18. The system of claim 15, wherein the second and subsequent cables have positive buoyancy and the first cable has sufficient negative buoyancy for the first cable to rest on the sea floor.

19. The system of claim 15, wherein the connecting members maintain the desired heights between the cables.

20. A system to measure voltages at various locations in a marine environment, comprising:
   an electromagnetic energy source;
   an array of electromagnetic receivers arranged in a substantially vertical grid in the marine environment;
   an instrumentation package in electrical communication with the receivers; and
   plurality of arrays of electromagnetic receivers arranged in substantially vertical grids in the marine environment to form a 3-dimensional configuration of receivers.

* * * * *